May 29, 1934.  S. J. THALHEIMER  1,960,464
ANT TRAP
Filed June 13, 1932
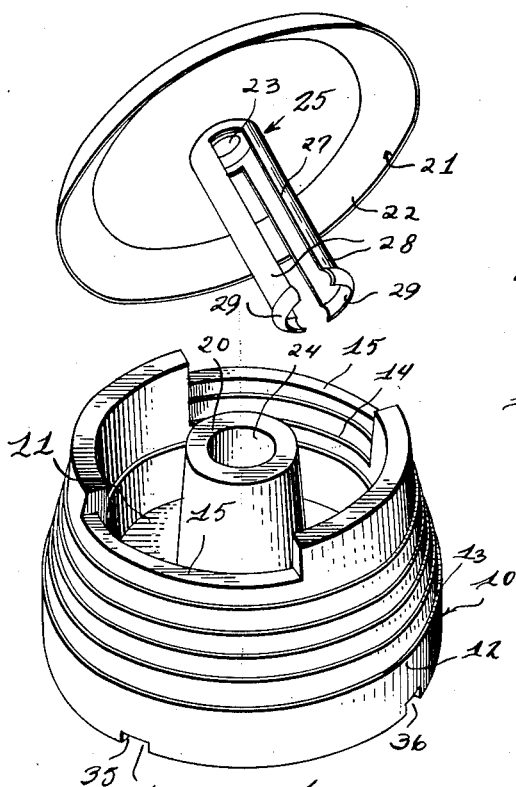
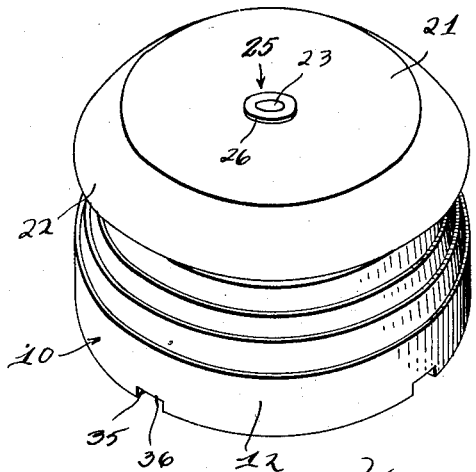
Fig. 1.
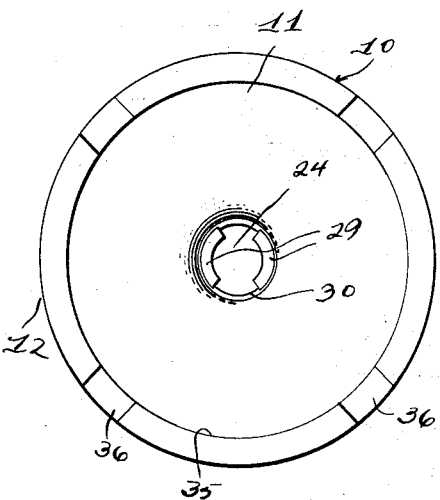
Fig. 2.
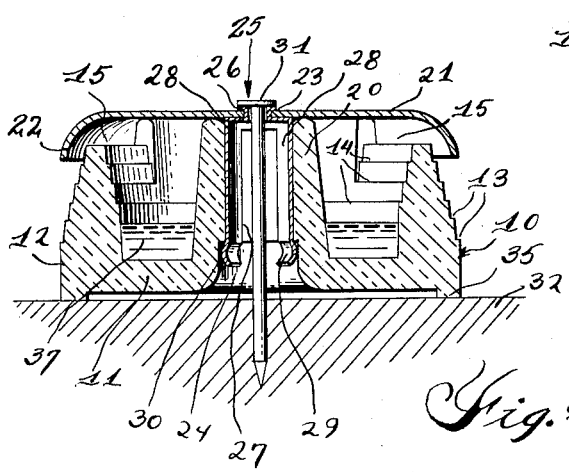
Fig. 4.
Inventor
Samuel J. Thalheimer
Attorneys

UNITED STATES PATENT OFFICE 1,960,464

ANT TRAP

Samuel J. Thalheimer, Detroit, Mich., assignor to Acme White Lead and Color Works, Detroit, Mich., a corporation of Michigan Application June 13, 1932, Serial No. 616,999

6 Claims. (Cl. 43—131)

This invention relates to a trap adapted more particularly for use in exterminating insect pests such as ants and the like.

One of the primary objects of this invention is to provide a trap of the above mentioned character adapted to receive a quantity of a poison and to provide means for rendering the poison contained in the trap substantially inaccessible to animals or the like which might be harmed by the poison.

The invention further contemplates the provision of a trap of the above mentioned character which may be permanently positioned outdoors and to provide means for shielding the poison within the trap from rain and the like.

Still further the invention contemplates the provision of a trap which may be readily anchored in a desired position and in which the anchoring means will function not only to retain the trap in position, but to also retain the cover in position on the body of the trap.

Fig. 1 is a perspective view of a trap constructed in accordance with the teachings of this invention;

Fig. 2 is a bottom plan view of the trap shown in Fig. 1;

Fig. 3 is a perspective view of the trap showing the parts thereof in spaced relation to each other; and Fig. 4 is a sectional view through the trap.

Referring then particularly to the drawing wherein like reference characters designate corresponding parts throughout all views, the numeral 10 designates generally a receptacle having a floor 11 and a circular wall 12 projecting upwardly from the outer edge of the floor. The wall 12 is of tapering thickness from its base to its upper edge, decreasing in thickness in a series of steps to provide a series of upwardly facing shoulders 13 and 14 on the inner and outer surfaces of the wall, as clearly illustrated in Figs. 3 and 4 of the drawing. The wall is further provided adjacent its upper edge with circumferentially spaced cutaway portions or recesses 15 which cooperate with the cover of the receptacle to provide openings to the interior of the receptacle, as will hereinafter be more fully described.

The floor of the receptacle is provided substantially centrally with an upwardly projecting hollow standard 20 which terminates at its upper end in substantially the plane of the upper edge of the wall. An oversize cover 21 having a downwardly rounded edge portion 22 is adapted to seat on the upper end of the hollow standard and on the upper edge of the outer wall of the receptacle in the manner clearly illustrated in Fig. 4 of the drawing, it being noted that when the cover is in this position, entrance openings are formed between the cover and the upper edge of the wall of the receptacle by the recesses in the receptacle wall.

The cover of the receptacle is provided centrally with an opening 23 which, when the cover is in position on the receptacle, registers with the opening 24 formed through the hollow standard. A hollow stud 25 is secured to the receptacle with the opening in the stud registering with the opening in the receptacle. This may be conveniently accomplished by forming a return bend 26 on the stud adjacent the opening therein, the portion of the cover defining the opening in the cover being embraced between the return bend 26 on the stud and the adjacent body portion of the stud. The stud is longitudinally cut as at 27 to provide spring fingers 28 which are adapted to extend into the opening 24 formed in the hollow standard 20. These spring fingers are provided at their lower ends with outwardly flared flanges 29 forming shoulders adapted to engage under shoulders 30 formed on the inner surface of the hollow standard adjacent the lower end thereof.

For securing the receptacle in a desired position, a securing element such as a nail 31 may be inserted through the cover, hollow stud and hollow standard and then driven into any suitable support such for example as the floor 32 shown in Fig. 4 of the drawing. It is to be understood that the receptacle may be secured to any support whether it be a floor or the ground, depending entirely upon the location where it is desired to place the receptacle. It will be noted that when the receptacle is secured in place as by the nail 31, this securing element serves not only to anchor the receptacle in position, but serves also to rigidly secure the cover in position on the receptacle.

If desired, the under face of the floor of the receptacle may be provided at its edge with a shallow flange 35 provided at circumferentially spaced points with cutaway portions 36. This flange provides a supporting base of relatively small area and thus will facilitate the level positioning of the receptacle, regardless of slight irregularities in the surface on which the receptacle rests. Further, if desired, the interior shoulders 14 on the receptacle wall may only extend the distance of the cutaway portions of the upper edge of the receptacle wall, the interior of the wall being otherwise smooth.

In use, a quantity of a suitable poison, preferably a liquid, as designated by the reference character 37, is poured into the annular recess formed between the wall of the receptacle and the hollow standard 20. This poison liquid is generally sweetened in order that the same will be attractive to ants and the like.

The cover is then placed on the receptacle and the receptacle placed in the location desired, the use of the nail to anchor the receptacle in position being optional.

Insects such as ants will be attracted to the receptacle and may crawl upwardly over the outer surface of the receptacle wall by virtue of the upwardly facing shoulders 13 on this wall. The insects may enter the receptacle by way of the entrance openings formed between the cutaway portions of the upper edge of the receptacle wall and the receptacle cover and may then crawl downwardly to a point where they may reach the poison liquid by virtue of the interior shoulders 14. It is contemplated that the ants will collect a quantity of the poison and carry the same back to the nests and thus effect an extermination of the complete nest.

From the above it will be apparent that the invention provides a trap in the form of a receptacle adapted to receive a poison liquid. The receptacle is provided with a cover which prevents rain water and the like from contacting with the poison and thus diluting the same. Further, the cover renders the poison inaccessible to animals or the like which might be injured thereby, although provision is made for the entrance and exit of ants and the like to and from the interior of the receptacle. Anchoring means is provided, the use of which is optional and which when used will act to not only anchor the receptacle in position, but also to secure the cover firmly in place on the receptacle.

What I claim as my invention is:

1. In a device of the character described, a receptacle, means providing shoulders on said receptacle, a cover for said receptacle, and means for securing said cover to said receptacle including a member fixed to said cover and having depending resilient arms provided with shoulders resiliently engageable with the shoulders on said receptacle.

2. In a device of the character described, a receptacle having a hollow standard connected to and projecting upwardly from its floor, a cover for said receptacle, and a member fixed to said cover and having spring arms extending into the hollow standard and resiliently engageable with the same.

3. In a device of the character described, a receptacle having a hollow standard projecting upwardly from the floor thereof, said hollow standard being open at its top and being provided on its inner surface with shoulders, a cover for said receptacle, and a member fixed to said cover and having spring arms projecting downwardly into said hollow standard, said spring arms having shoulders resiliently engageable under the shoulders on the inner surface of said hollow standard.

4. In a device of the character described, a receptacle having a hollow standard projecting upwardly from its floor, an oversize cover for said receptacle, said cover having an opening registering with the opening in said standard, a hollow stud secured to said cover and having a depending portion engaging the inner surface of said hollow standard, and a securing member passing through said cover, said stud and said hollow standard for securing said cover to said receptacle and said receptacle to a support.

5. In a device of the character described, a receptacle having a floor, a circular wall at the edge of said floor, and a hollow standard projecting upwardly from substantially the center of said floor to provide an annular fluid receiving recess between the standard and wall, said hollow standard being provided on its inner surface with shoulders said wall decreasing in thickness in a series of steps from its base to its upper edge to provide a series of annular upwardly facing shoulders on its inner and outer surfaces, and said wall being provided in its upper edge with circumferentially spaced recesses, an oversize cover for said receptacle adapted to seat on the upper edges of said wall and standard, the recesses in the upper edge of the wall providing entrance openings between the cover and wall to the interior of the receptacle, said cover being provided with an opening adapted to register with the opening through said hollow standard, a hollow stud fixed to said cover with the opening in said stud registering with the opening in said cover and having spring fingers projecting into said hollow standard, and said spring fingers having outwardly projecting shoulders at their lower ends arranged to engage under the shoulders on the inner surface of said hollow standard, and a nail passing through said cover, stud and hollow standard for securing said receptacle to a support.

6. In a device of the character described, a receptacle, means integral with said receptacle providing a downwardly facing shoulder, a cover for said receptacle, and a spring arm fixed to said cover and having a shoulder resiliently engageable with the shoulder provided by said means.

SAMUEL J. THALHEIMER.